United States Patent Office.

WILLARD B. WALTERS, OF LOCK HAVEN, PENNSYLVANIA.

Letters Patent No. 81,233, dated August 18, 1868.

IMPROVED COMPOSITION FOR CLEANING AND RENOVATING BRICK WALLS.

The Schedule referred to in these Letters Patent and making part of the same.

TO ALL WHOM IT MAY CONCERN:

Be it known that I, WILLARD B. WALTERS, of Lock Haven, in the county of Clinton, and State of Pennsylvania, have invented a new and improved Mode of Cleansing and Renovating Brick Buildings; and I do hereby declare that the following is a full and exact description thereof.

The nature of my invention consists in combining, with lime-water, refined petroleum, benzine, and Indian red, which will fuse at any degree of temperature, by stirring them well together, the application of which will restore the brick to their original fresh appearance.

To enable others skilled in the art of painting to make and use my invention, I will proceed to describe its preparation and application.

I take ten gallons of lime-water, one quart of benzine, one pint of refined petroleum, and two pounds of Indian red, and mix them well together, and apply the mixture with a common whitewash-brush, after which I pencil as in the case of a new building.

What I claim as my invention, and desire to secure by Letters Patent, is—

The combination of the ingredients above mentioned and described, and the application of the same to brick buildings, using for that purpose the aforesaid compound, or any other substantially the same, and which will produce the intended effect.

W. B. WALTERS.

Witnesses:
    JAS. CHATHAM,
    ORRIN T. NOBLE.